United States Patent [19]
Braun

[11] Patent Number: 5,895,892
[45] Date of Patent: Apr. 20, 1999

[54] OVERLOAD DETECTION SYSTEM

[75] Inventor: George John Braun, Bellerose Village, N.Y.

[73] Assignee: Interpool Limited, New York, N.Y.

[21] Appl. No.: 08/920,825

[22] Filed: Aug. 29, 1997

[51] Int. Cl.[6] .................. G01G 23/18; G01G 19/08; G01G 23/14

[52] U.S. Cl. .................. 177/45; 177/136; 177/137; 177/138; 177/173; 177/159

[58] Field of Search .................. 177/50, 136, 137, 177/138, 139, 140, 173, 225, 230, 174, 159, 186, 45

[56] References Cited

U.S. PATENT DOCUMENTS

| 1,500,541 | 7/1924 | Bernache | 177/136 |
|---|---|---|---|
| 1,689,978 | 10/1928 | Swartley | 177/173 |
| 2,181,277 | 11/1939 | Labbe | 177/45 |
| 2,490,860 | 12/1949 | Donaldson | 177/136 |
| 3,480,095 | 11/1969 | Tuchman | 177/137 |
| 4,384,628 | 5/1983 | Jackson | 177/137 |
| 5,376,760 | 12/1994 | Horsley | 177/137 |
| 5,811,739 | 9/1998 | Palmore | 177/136 |

FOREIGN PATENT DOCUMENTS

| 129222 | 8/1983 | Japan | 177/45 |

*Primary Examiner*—Randy W. Gibson
*Attorney, Agent, or Firm*—Pennie & Edmonds LLP

[57] ABSTRACT

A mechanical load indicator device continuously monitors the position of the frame of a vehicle relative to some point on the vehicle suspension. The load indicator device is calibrated to be triggered when a certain vehicle load limit is reached. When that load limit is reached or exceeded, the device is "triggered," providing an unambiguous visual indication to the vehicle operator that a vehicle overload condition has occurred. A method of installing, operating, and calibrating an overload detection system is also disclosed.

20 Claims, 5 Drawing Sheets

OVERLOAD DETECTION SYSTEM

BACKGROUND OF THE INVENTION

1. Field of the Invention

The field of the present invention relates to a load indicator apparatus for suspended wheeled vehicles, and more specifically pertains to a new and improved vehicle overload detection system. This system uses an indicator that utilizes the deflection of the suspension of the vehicle to determine if the maximum allowable axle loading limit has been exceeded.

2. Description of the Prior Art

It is important for operators of various types of passenger and cargo-carrying vehicles to be aware of vehicle overweight (overload) conditions occurring when the critical weight (load) limit is exceeded. Overweight conditions may present safety hazards if they exceed the design limit of the vehicle, or may present legal problems for the operator due to safety regulations, or both.

For example, commercial motor vehicles such as trucks, trailers, and containers-on-chassis must comply with Federal and State regulations with respect to the weight carried over each axle. There are both fines and possible removal from service for offenders exceeding the allowable axle loading.

Load indicators have been employed in the prior art to indicate loading of cargo-carrying vehicles relative to the axle structure. For example, U.S. Pat. No. 3,480,095 to Tuchman sets forth a load indicator structure which uses the relative motion of a railroad car and axle to drive a pointer linkage which indicates the car weight on a graduated scale. The structure in Tuchman provides an instantaneous indication of the specific load condition of the associated axle, but does not provide a simple qualitative indication of whether the maximum load limit has been exceeded. The Tuchman device also does not provide any mechanism by which the device may be re-calibrated for variables such as wear on the suspension system, which will effect the accuracy of the device.

Similarly, U.S. Pat. No. 4,384,628 to Jackson shows an overload detector with structure comprising a plurality of gears and cables, providing an indication of the instantaneous load condition to the operator. The structure in Jackson is relatively complicated, with a high part count, several moving parts, and the attendant reliability problems.

It has been recognized that what is required by the vehicle operator in most cases is a direct "Pass/Fail" indication of an overload condition, rather than a quantitative measure of vehicle weight. For example, U.S. Pat. No. 5,376,760 to Horsley describes an electric switch structure in association with the frame and leaf spring suspension structure of a truck. The signal resulting from activation of the switch provides an indication that the load condition associated with that switch has been exceeded. The use of electronics in the Horsley structure makes it susceptible to reliability problems which are not present in purely mechanical structures.

The instant invention overcomes the deficiencies in the prior art by providing for a direct "Pass/Fail" indication of an overload condition with a relatively uncomplicated mechanical indicator.

SUMMARY OF THE INVENTION

In view of the foregoing disadvantages in the prior art load indicator devices, the present invention provides a vehicle load indicator device apparatus utilizing the deflection of the vehicle suspension to determine if the critical axle loading limit has been exceeded. As such, the present invention offers the advantages of using a structure with low part count, few moving parts, high reliability, low manufacturing cost, ease of installation, simple calibration, and an unambiguous visual indication of an overload condition.

An object of the present invention is to provide a new and improved load indicator device comprising an indicator arm and a plunger assembly. The indicator arm is constrained to be rotatable relative to the vehicle frame. The plunger assembly includes a shaft with a pusher knob affixed to its upper end, in which the shaft is constrained to be slidable relative to the vehicle frame and the lower end of the shaft is in communication with any part of the suspension of the vehicle. For the purposes of this invention, the suspension includes all of those portions of the vehicle which are isolated from the vehicle frame by at least part of the suspension, and can include, for example, the axle housing, the drivetrain housing, or an intermediate point on an leaf spring suspension.

The indicator device is designed to "trigger" when a certain pre-calibrated load limit (the calibrated vehicle load limit) is exceeded. When the vehicle is subjected to a load less than this triggering load, the indicator arm will be disposed above the pusher knob. In response to increasing loads on the vehicle frame, the vehicle suspension will be compressed so as to push upwards on the lower end of the shaft, such that the plunger assembly will be displaced upward relative to the frame. When the triggering load is reached or exceeded, the pusher knob will have moved upwards sufficiently to allow the indicator arm to rotate to a position below the pusher knob. This triggered condition indicates that the calibrated vehicle load limit has been reached or exceeded—in other words, the possible existence of a vehicle overload condition.

A further object of the present invention is to provide a new and improved vehicle load indicator further comprising a support plate releasably attached to the vehicle frame, the plate having means for slidably receiving the shaft of the plunger assembly and providing a means for mounting the plunger assembly and pivot arm.

A further object of the present invention is to provide a new and improved vehicle load indicator in which the support plate is provided with first and second adjustment slots in substantially parallel orientation to each other. These slots allow the plate to be adjusted over a range of vertical positions, and when the plate is in the desired position, to be releasably attached to the frame.

A further object of the present invention is to provide a new and improved vehicle load indicator further comprising, rather than slots in the support plate, a pair of angle brackets affixed to the vehicle frame in substantially parallel orientation to each other. These angle brackets, in conjunction with the vehicle frame, will present retaining grooves in which the support plate can be adjusted over a range of vertical positions, and when the plate is in desired position, to be releasably attached to the frame.

A further object of the present invention is to provide a new and improved vehicle load indicator comprising: a support plate having first and second adjustment slots in substantially parallel orientation to each other, the slots allowing the plate to be adjustably attached to the frame of a vehicle over a range of vertical positions; a journal block affixed to the plate and having a vertical bore; a plunger assembly including a shaft with a pusher knob affixed to the upper end, the shaft slidably received by the vertical bore and the lower end of the shaft in contact with the suspension of the vehicle; an indicator arm rotatably attached to the support plate; and a biasing spring, positioned between the indicator arm and the support plate.

A further object of the present invention is to provide a new and improved vehicle load indicator further comprising a rod end affixed to the lower end of the shaft.

A further object of the present invention is to provide a new and improved vehicle load indicator in which the lower end of the shaft is in free contact with the axle housing of the vehicle.

It is another object of the present invention to provide a new and improved vehicle load indicator in which the lower end of the shaft is affixed to the axle housing of the vehicle.

It is yet another object of the present invention to provide a new and improved vehicle load indicator further comprising antifriction means for reducing the sliding friction of the shaft with respect to the vertical bore. The antifriction means may comprise solid bushings, recirculating ball bearings, or other suitable friction-reducing devices.

A further object of the present invention is to provide a new and improved vehicle load indicator comprising: a support plate having first and second adjustment slots in substantially parallel orientation to each other, the slots allowing the plate to be adjustably attached to the frame of a vehicle over a range of vertical positions; a journal block affixed to the plate and having a vertical bore, the bore having upper and lower antifriction devices disposed therein; a plunger assembly including a shaft with a pusher knob affixed to the upper end, the shaft slidably received by the vertical bore and the lower end of the shaft in contact with the suspension of the vehicle; an indicator arm rotatably attached to the support plate; and a biasing spring, positioned between the indicator arm and the support plate.

A further object of the present invention is to provide a new and improved method for indicating load conditions for a suspended vehicle having a maximum allowable vehicle load limit. The method includes the steps of installing an indicator assembly comprising an indicator arm which is rotatable relative to the vehicle frame and a plunger assembly having a pusher knob affixed to its upper end and its lower end in contact with the suspension; loading the vehicle; and detecting the position of the indicator arm during operation of the vehicle.

A further object of the present invention is to provide a new and improved method for indicating load conditions for a suspended vehicle, further including the step of alleviating the load condition when the indicator is detected as being in the triggered state, before continuing to operate the vehicle further.

A further object of the present invention is to provide a new and improved method for indicating load conditions for a suspended vehicle, further including the step of calibrating a load indicator assembly after it is installed.

A further object of the present invention is to provide a new and improved vehicle load indicator having a multi-step calibration procedure. The calibration procedure is summarized as: loading the vehicle to a calibrated vehicle load limit; adjusting the load indicator assembly such that it is triggered; unloading the vehicle; and manually resetting the indicator.

A further object of the present invention is to provide a new and improved vehicle axle load indicator apparatus which has a low manufacturing cost due to both the low part count and the ease of installation.

A further object of the present invention is to provide a new and improved vehicle axle load indicator apparatus which is reliable and accurate, and which, due to the ease of installation, will provide an accurate and unambiguous "Pass/Fail" indication of problematic axle load conditions to the vehicle operator.

A further object of the present invention is to provide a new and improved vehicle axle load indicator apparatus which may be easily re-calibrated after it is installed, thus providing improved long-term accuracy.

These and other objects of the invention will be apparent to those of ordinary skill in this art from the following description.

DETAILED DESCRIPTION OF THE PREFERRED EMBODIMENTS

Figure 1:
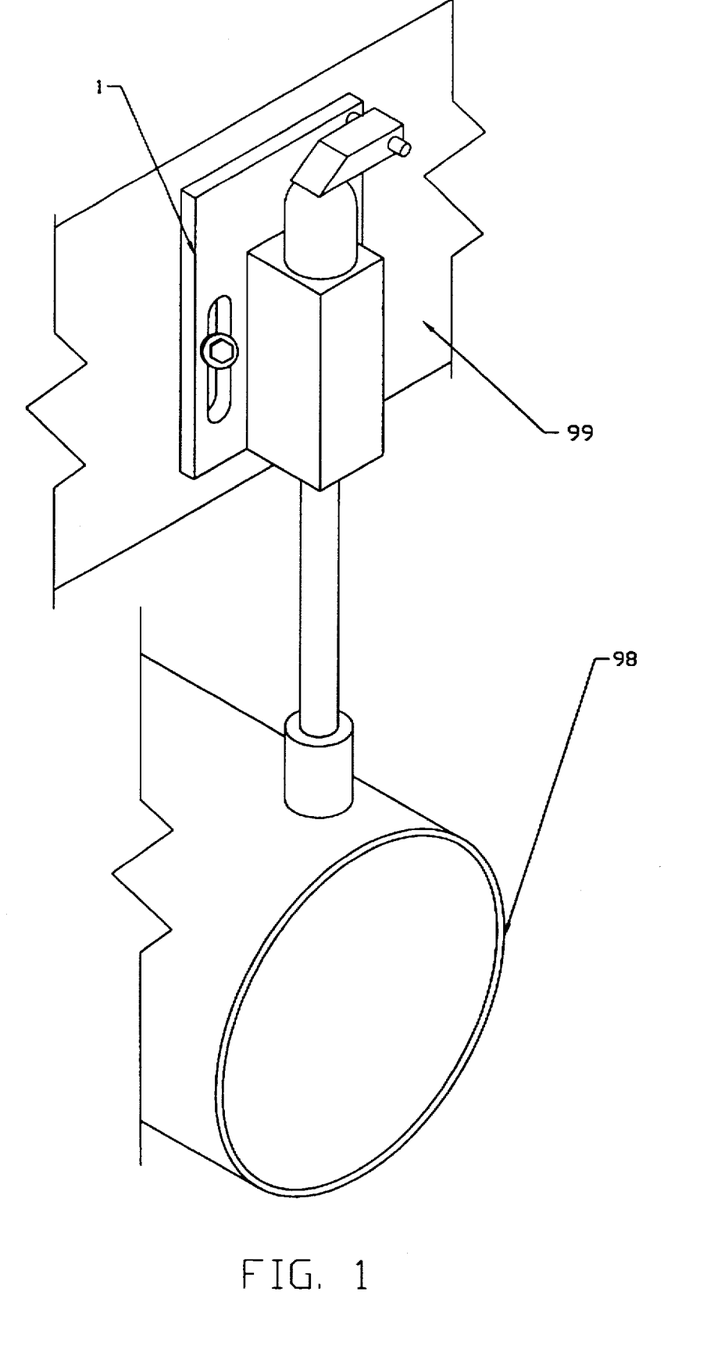
FIG. 1 is an isometric view of a vehicle load indicator in an unloaded state in a preferred embodiment in accordance with the present invention.

With reference to FIG. 1, the load indicator device 1 of the present invention provides an indication of the loading of the vehicle by measuring the motion of the vehicle frame 99 relative to some part of the vehicle suspension, such as the axle housing 98.

Figure 2A:
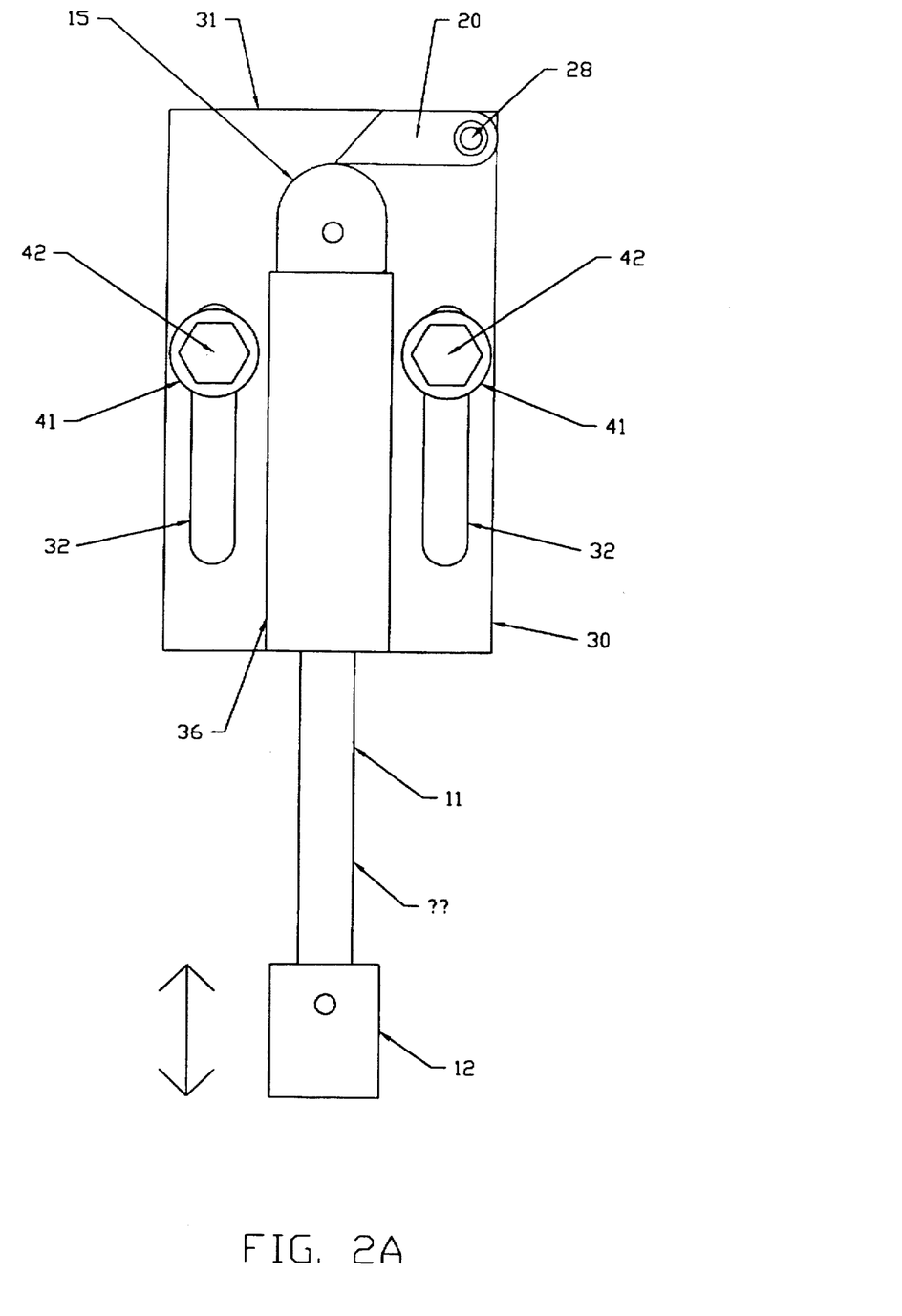
FIG. 2A is a front elevation view of a vehicle load indicator in an unloaded state in a preferred embodiment in accordance with the present invention.

The operation of the load indicator device in accordance with the present invention will be summarized by reference to FIGS. 2A, 2B and 3A–3C. The load indicator device of the present invention comprises a plunger assembly 10 slidably directed through a longitudinal bore 37 through journal block 36. The bottom end of the plunger assembly 10 is in operative communication with the axle housing (not illustrated in FIGS. 2A, 2B, and 3A–3C). As the load in the vehicle is varied, the suspension will respond elastically, resulting in displacement of the vehicle frame relative to the vehicle axle. This displacement will lead in turn to the plunger assembly 10 moving slidably up and down relative to the support plate 30 and associated parts. As can be seen in FIG. 2A, plunger assembly consists of a shaft 11 having pusher knob 15 at its upper end, and rod end 12 at its lower end.

Figure 2B:
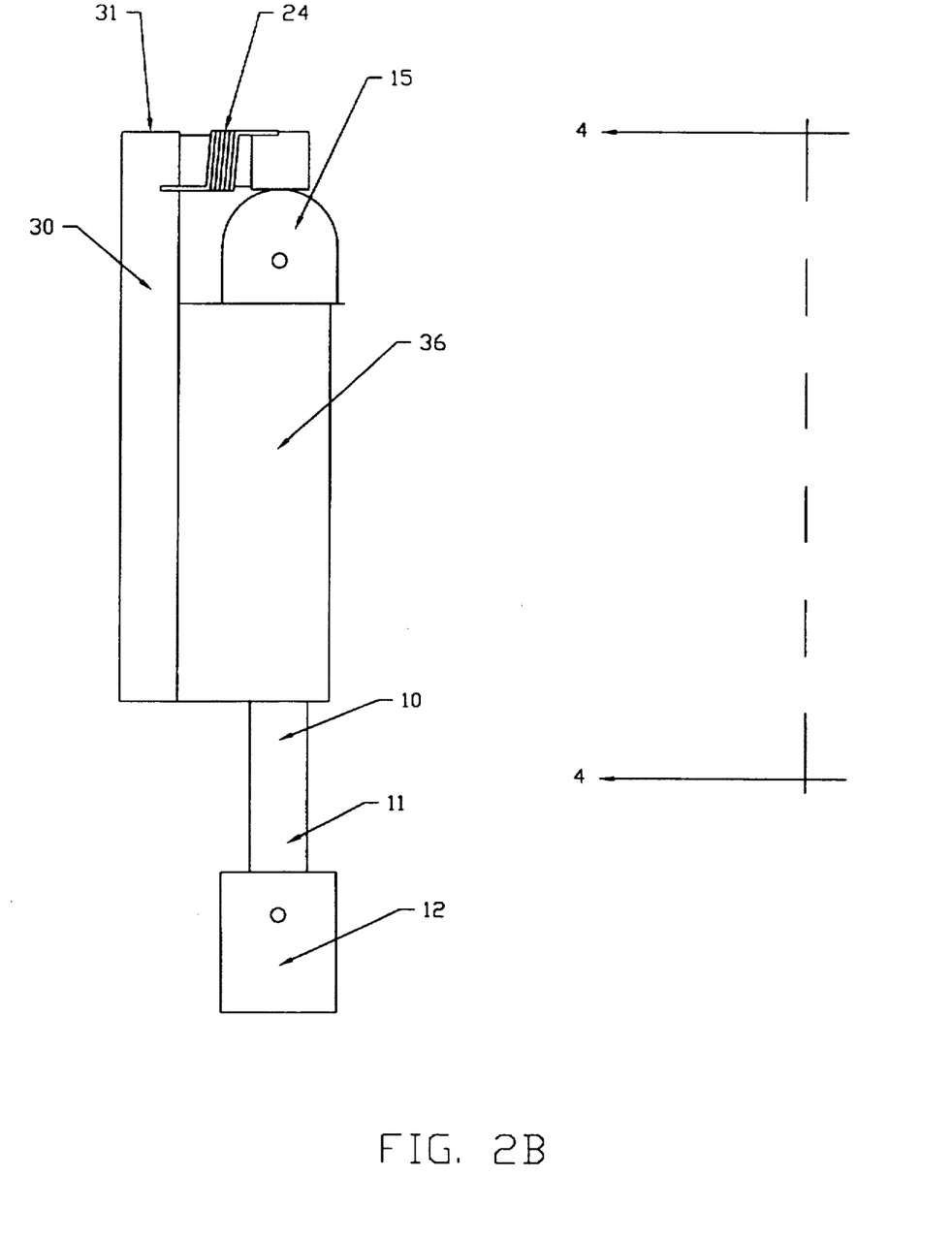
FIG. 2B is a side elevation view of a vehicle load indicator in an unloaded state in a preferred embodiment in accordance with the present invention.

The indicator arm 20 is rotatably fixed to support plate 30 by pivot 28. Indicator arm 20 is biased downwardly by a torsion spring 24 having straight offset ends as illustrated in FIG. 2B. One end of the torsion spring 24 engages support plate 30, while the other engages indicator arm 20. The torsion spring 24 is installed with the appropriate pre-load such that with the device in its unloaded state with the indicator arm 20 horizontal, the torsion spring provides a biasing force to hold the arm 20 down against the pusher knob 15.

The journal block 36 may be formed in a unitary piece with support plate 30, or may be formed separately and affixed to support plate 30 by bolting, welding, or other suitable means. Adjustment slots 32 in the plate 30 are in parallel orientation to each other, allowing vertical adjustment of the support plate 30 relative to the vehicle frame 99. The slots must be dimensioned so as to accommodate the full range of expected loads and calibration positions, as will become clear from the explanations below.

Figure 4:
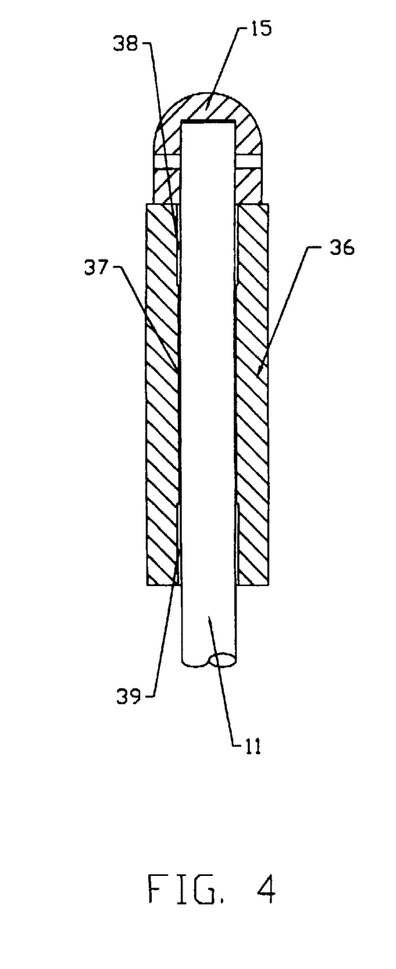
FIG. 4 is a sectional view along the line 4—4 in FIG. 2B.
Figure 5:
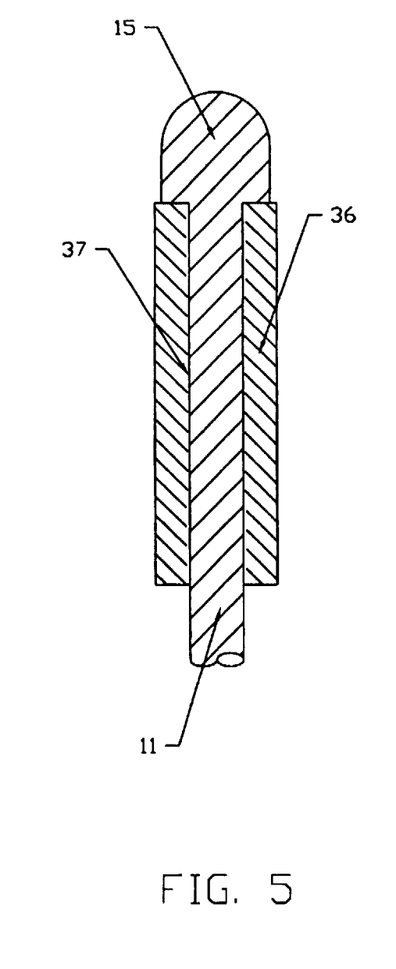
FIG. 5 is a sectional view of an alternative embodiment of the indicator illustrated in FIG. 4.

As illustrated in FIG. 4, upper and lower antifriction devices 38 and 39 may be disposed within the longitudinal bore 37 in order to reduce the sliding friction of shaft 11. The antifriction devices may be solid bushings, recirculating rolling ball bearings, or other suitable bearings as known in the art. Alternatively, as illustrated in FIG. 5, the shaft 11 and the longitudinal bore 37 may be dimensioned to allow direct sliding contact of the shaft 11 within the bore 37.

The bottom end of the plunger assembly 10 may be fixed to the axle housing. However, this poses the risk that when the vehicle is lightly loaded or totally unloaded, the plunger assembly 10 will be subject to tensile forces originating in the suspension system. Such forces could impair the accuracy or reliability of the load indicator device 1, or could even result in a catastrophic failure. Therefore, it is preferred that the shaft 11 freely rides on top of that part of the suspension it is communicating with, as shown in FIG. 1.

Figure 3A:
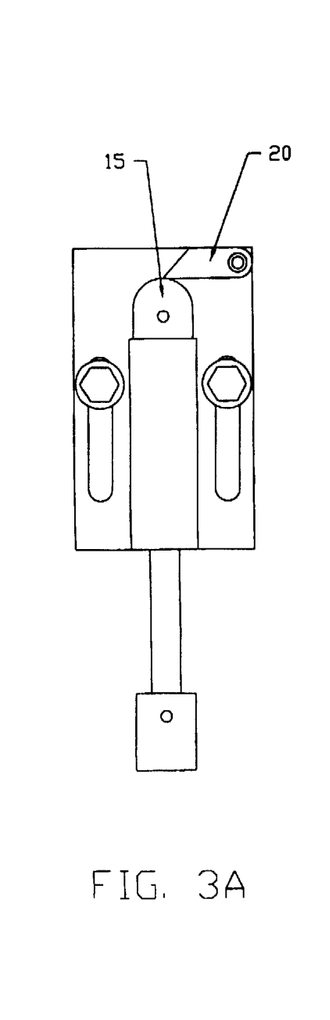
FIGS. 3A–3C are front elevation views of a vehicle load indicator in a preferred embodiment in accordance with the present invention, in an unloaded condition (FIG. 3A), intermediate load condition (FIG. 3B), and a triggered condition (FIG. 3C)
Figure 3B:
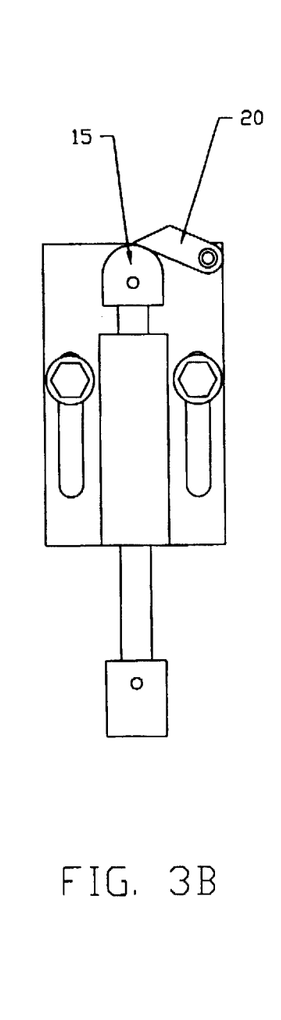
Figure 3C:
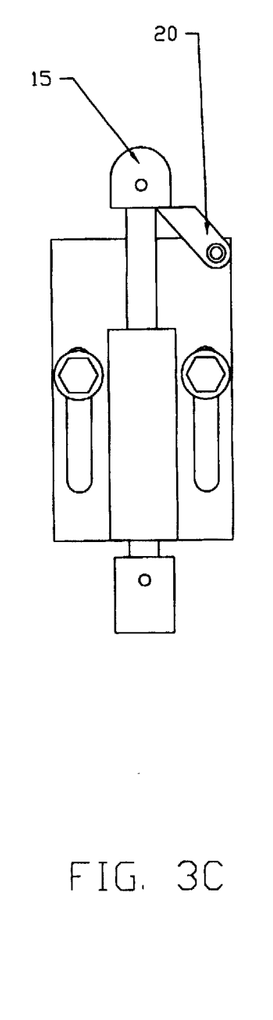

The bottom end of the shaft 11 may be in direct communication with the suspension system, or as shown in FIGS. 1–3, a rod end 12 may be affixed to the shaft. Both the rod end 12 and pusher knob 15 may be affixed to the shaft by press fit, roll pin, or other suitable methods.

Installation

Installation is accomplished under a "no-load" condition (i.e., with the vehicle empty of loads such as passengers or cargo). The support plate 30 is placed in contact with the vehicle frame 99, and is oriented such that the plunger assembly 10 is substantially vertical. First the horizontal position of the support plate is manually adjusted until the plunger assembly 10 is positioned above the axle housing 98, with a clearance between the rod end 12 and axle housing 98. The support plate 30 is then lowered vertically until the rod end 12 comes into contact with axle housing 98. Once the support plate is in this desired installation position, holes for bolts 42 are drilled and tapped in the frame 99, at a location corresponding to the top of slots 32. Finally, the support plate 30 is secured to the frame 99 using bolts 42 and lock washers 41.

It may be desirable to locate the device such that it is visible, either directly, or by the use of mirrors, by the vehicle operator in the normal course of vehicle operation.

Operation

As shown in FIG. 3A, when the vehicle is in a no-load condition, the plunger assembly will be in the rest position, with the push knob 15 resting on top of the journal block 36. During operation, as the load in the vehicle is increased, the resulting compression of the suspension system will cause the suspension to push upwards on the bottom of the plunger assembly 10, causing the plunger assembly to move upward relative to the support plate 30 and associated parts. In this intermediate load condition (between the no-load and triggered conditions), as illustrated in FIG. 3B, the pusher knob 15 located at the upper end of the shaft 11 will be forced upwards against the indicator arm 20, pushing the arm away from the horizontal towards the vertical. The torsion spring 24 ensures that the indicator arm 20 will not be affected by the jostling of the vehicle travel, and helps to maintain sliding contact between the arm 20 and the rounded top surface of the knob 15.

Finally, when the triggering load is reached, the pusher knob 15 will have moved upwards sufficiently for the indicator arm 20 to swing below the pusher knob 15. It is this configuration, defined by the pusher knob 15 being positioned above the arm 20, illustrated in FIG. 3C, that serves as the unambiguous visual indication that a problematic load condition exists. The load indicator device will remain in this "triggered" condition until the problematic load condition is alleviated and the device is manually reset.

Under normal service loading, the device will be in some intermediate load position as in FIG. 3B but not in the "triggered" condition of FIG. 3C. Should the device be observed in the "triggered" condition of FIG. 3C, it means that the calibrated load limit over the axle has been reached or exceeded, such that the load condition should be alleviated (by reducing or re-positioning the load) and the device manually reset before further operation of the vehicle. The load indicator device is manually reset by first manually lifting the plunger assembly 10 sufficient to allow the indicator arm 20 to be manually swung upwards clear of the bottom edge of the pusher knob 15, then releasing the plunger assembly allowing it to drop down to the unloaded position, and finally releasing the indicator arm 20 allowing it to rest on top of the pusher knob 15. The vehicle may then be put back into service.

Calibration and Re-Calibration

To improve the accuracy of the results, the load indicator device of the present invention should be calibrated before the initial use, and periodically over the life of the device. To summarize the calibration procedure, the vehicle is loaded at or near its maximum allowable load limit, the device is adjusted to a triggered state, the load is removed, and the device is reset.

It should be noted that in practice it may be desirable to calibrate the device so as to trigger while loaded with what is technically an allowable load. For example, if the maximum allowable load is 20,000 pounds, it may be desirable to calibrate the device with a safety margin of 200 pounds, that is, a calibration load of 19,800 pounds. The load used during the calibration is also known as the calibrated vehicle load limit, and this is the triggering load for the calibrated device.

By using a calibrated vehicle load limit that is less than the maximum allowable load limit, the vehicle is put into operation with a safety margin to account for factors such as unexpected increases in load weight (e.g., by a porous load absorbing moisture from the atmosphere), measurement errors (which could occur, for example, during calibration, loading with the actual cargo, or measurement by compliance personnel), or other unpredictable factors which could affect accurate operation of the device. It will be evident to one of skill in the art that it may be desirable to incorporate such a safety margin into the system. However, the precise value of the safety margin, if any, will depend on the specific operating parameters in each case.

Before calibrating the device, the vehicle axle in question is positioned over a suitable scale. For example, if the vehicle is a truck, it can be positioned on a scale similar to those used by State Troopers' weighing stations to verify commercial vehicle compliance with loading regulations. The subject vehicle is then loaded (with an actual load such as passengers or cargo, or with some mass or device that simulates an actual load) until the axle reaches the calibrated vehicle load limit as read on the scale.

The suspension of the vehicle will deflect under this load in the same way that a car deflects when a number of passengers gets in. With the "offending" weight still applied, (and the vehicle's suspension correspondingly deflected), the bolts 42 are loosened but not removed, permitting vertical adjustment of support plate 30 relative to the vehicle frame. With the bolts 42 sliding in slots 32, the vertical adjustment of the support plate 30 may begin. First the plate 30 is raised sufficiently to take the bottom of the plunger assembly out of contact with the axle housing. This permits the plunger assembly to fall to the unloaded position in which the bottom surface of the pusher knob 15 rests against the top surface of the journal block 36, and the indicator arm 20 rests on top of knob 15, in a vertical orientation as shown in FIG. 3A. The support plate 30 is then slowly lowered until the bottom of the plunger assembly 10 comes into contact with the axle housing and the plunger assembly's downward motion is prohibited. The plate is lowered further, causing an upward displacement of the plunger assembly relative to the plate, pushing the knob 15 up against the indicator arm 20. Finally, the pusher knob will be displaced sufficiently far upwards relative to the plate 30 that the indicator arm 20 will swing down below the pusher knob 15. At this point the plate 30 is in the proper calibrated position and is not lowered any further; the bolts 42 are re-tightened securing the support plate 30 in this position against the frame. The test load is then removed, and the load indicator device is manually reset as described above, and the vehicle may then be put into service.

It should be noted that this calibration method automatically includes and accounts for the vehicle "tare weight", i.e., the empty weight of the vehicle. This is an important feature, because the tare weight is part of the total allowable vehicle weight under many regulatory schemes. Load measurement schemes which are based upon the incremental load weight but which do not account for tare weight yield inaccurate results. Use of such systems in practice will be complicated by the need to incorporate the effects of vehicle weight before obtaining a load indication which can properly be compared to the load condition permitted under the applicable regulation.

Figure 6:
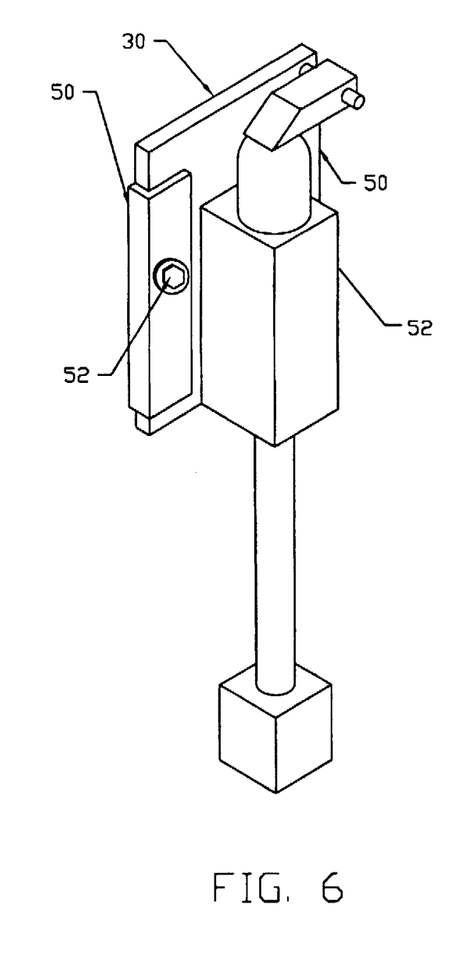
FIG. 6 is an isometric view of an alternate embodiment of a vehicle load indicator in accordance with the present invention.

It will be understood by those skilled in the art that the foregoing represents merely sample embodiments of the invention and that modifications and alternative implementations are possible without departing from the basic intent or scope of the present invention. An alternative embodiment for example, is to use angle brackets or channels rather than the slots 32 for the vertical adjustment of the support plate 30. In this embodiment, illustrated in FIG. 6, a pair of angle brackets 50 are affixed to the vehicle frame, in a parallel orientation and spaced apart the width of the support plate. The brackets, in conjunction with the vehicle frame, present a pair of retaining grooves in which the plate 30 can slide up and down. The brackets are provided with threaded holes for bolts 52 which are tightened down when the plate is in the desired position.

In another embodiment of a load indicating device according to the present invention, part of the suspension other than the axle housing, such as the leaf spring, can be used as the point on the suspension contacting the bottom end of the plunger assembly 10.

In yet another embodiment, the load indicating device of the present invention can incorporate an electronic aspect wherein the bottom of the plunger assembly 15 and the tip of the indicator arm 20 form the contacts of an electric switch. In such a system, these contacts form a closed circuit when the apparatus is in the triggered condition—this circuit can drive any appropriate signaling system, such as an audio alarm or a visual display to assist in drawing the attention of the vehicle operator to the problematic load condition. Therefore, the preceding should be considered illustrative and not as limiting the scope of the following claims.

What is claimed is:

1. A load indicator device for a suspended vehicle having a frame comprising:

a plunger assembly including a shaft having first and second ends and a pusher knob having a pushing surface, said pusher knob affixed to said first end, said shaft slideably constrained relative to the vehicle frame and said second end in contact with the suspension of the vehicle; and an indicator arm having a free end, said indicator arm rotatable relative to the vehicle frame;

in which when the vehicle is loaded less than a triggering load, said free end of said indicator arm is disposed in sliding contact with said pushing surface, and in response to loads on the vehicle frame, the vehicle suspension is compressed so as to push in a first direction on said second end of said shaft, displacing said plunger assembly in the first direction relative to the frame, rotating said free end of said indicator arm in the first direction, such that when the vehicle is loaded with a load equal to or greater than the triggering load, said plunger assembly moves in the first direction sufficiently to allow said free end of said indicator arm to rotate to a position in which it is no longer in sliding contact with said pushing surface, in which position said indicator arm prevents said plunger assembly from moving in a direction opposite to the first direction, absent manual intervention.

2. The load indicator apparatus as set forth in claim 1, further comprising a support plate releasably attached to the vehicle frame, said plate having means for slidably receiving said shaft.

3. The load indicator apparatus as set forth in claim 2, in which said support plate has first and second adjustment slots in substantially parallel orientation to each other, said slots allowing the plate to be adjusted over a range of vertical positions and releasably attached to the frame in a desired position.

4. The load indicator apparatus as set forth in claim 2, further comprising a pair of angle brackets affixed to the vehicle frame in substantially parallel orientation to each other, said angle brackets, in conjunction with the vehicle frame, presenting retaining grooves in which said support plate can be adjusted over a range of vertical positions and releasably attached to the frame in a desired position.

5. A load indicator device for a suspended vehicle comprising:

a support plate having first and second adjustment slots in substantially parallel orientation to each other, said slots allowing said plate to be adjustably attached to the frame of a vehicle over a range of vertical positions;

a journal block affixed to said plate and having a vertical bore;

a plunger assembly including a shaft having first and second ends, a pusher knob having a pushing surface, said pusher knob affixed to said first end, said shaft slideably received by said vertical bore and said second end in contact with the suspension of the vehicle;

an indicator arm having a free end, said indicator arm rotatably attached to said support plate; and a biasing spring, positioned between said indicator arm and said support plate;

in which when the vehicle is loaded less than a triggering load, said free end of said indicator arm is disposed in sliding contact with said pushing surface, and in response to loads on the vehicle frame, the vehicle suspension is compressed and pushes in a first direction on said second end of said shaft, displacing said plunger assembly in said first direction relative to the frame, rotating said free end of said indicator arm in the first direction, such that when the vehicle is loaded with a load equal to or greater than the triggering load, said plunger assembly moves in said first direction sufficiently to allow said free end of said indicator arm to rotate to a position in which it is no longer in sliding contact with said pushing surface, in which position said indicator arm prevents said plunger assembly from moving in a direction opposite to the first direction, absent manual intervention.

6. The load indicator apparatus as set forth in claim 5, further comprising a rod end affixed to said lower end of said shaft.

7. The load indicator apparatus as set forth in claim 5, in which said lower end of said shaft is in free contact with the axle housing of the vehicle.

8. The load indicator apparatus as set forth in claim 5, in which said lower end of said shaft is affixed to the axle housing of the vehicle.

9. The load indicator apparatus as set forth in claim 5, further comprising antifriction means for reducing the sliding friction of said shaft with respect to said vertical bore.

10. The load indicator apparatus as set forth in claim 9, in which said antifriction means comprise solid bushings.

11. The load indicator apparatus as set forth in claim 9, in which said antifriction means are recirculating rolling ball bearings.

12. A load indicator device for a suspended vehicle comprising:

a support plate having first and second adjustment slots in substantially parallel orientation to each other, said slots allowing the plate to be adjustably attached to the frame of a vehicle;

a journal block affixed to said support plate and having a vertical bore, said bore having upper and lower antifriction devices disposed therein;

a plunger assembly including a shaft having first and second ends, a pusher knob having a pushing surface, said pusher knob affixed to said first end and a rod end affixed to said second end, said shaft slideably received by said vertical bore and said rod end in free contact with the axle housing of the vehicle; and an indicator arm having a free end, said indicator arm rotatably attached to said support plate; and a biasing spring, positioned between said indicator arm and said support plate;

in which when the vehicle is loaded less than a triggering load, said free end of said indicator arm is disposed in sliding contact with said pushing surface, and in response to loads on the vehicle frame, the vehicle suspension is compressed and pushes in a first direction on said second end of said shaft, displacing said plunger assembly in the first direction relative to the frame, rotating said free end of said indicator arm in the first direction, such that when the vehicle is loaded with a load equal to or greater than the triggering load, said plunger assembly moves in the first direction sufficiently to allow said free end of said indicator arm to rotate to a position in which it is no longer in sliding contact with said pushing surface, in which position said indicator arm prevents said plunger assembly from moving in a direction opposed to the first direction, absent manual intervention.

13. A method for indicating load conditions for a suspended vehicle having a calibrated vehicle load limit, which comprises:

installing an indicator assembly comprising an indicator arm having a free end, said indicator arm rotatable relative to the vehicle frame and a plunger assembly having a pusher knob having a pushing surface, said pusher knob affixed to said first end and said second end in contact with any portion of the suspension, said free end of said indicator arm initially in sliding contact with said pushing surface when the vehicle is loaded with less than a triggering load, and said plunger assembly moving in a first direction in response to increasing vehicle loads, such that when the triggering load is reached, said plunger assembly moves in the first direction sufficiently for said free end of said indicator arm to rotate to a position in which it is no longer in sliding contact with said pushing surface;

loading the vehicle; and detecting the position of the indicator arm relative to said pusher knob.

14. The method of claim 13, further including, after said detecting step, the step of alleviating the load condition when the indicator arm is detected as being positioned below the pusher knob, before continuing to operate the vehicle further.

15. The method of claim 13, further including, after said installation step, the step of calibrating the load indicator assembly.

16. The method of claim 15, wherein the calibration step comprises: loading the vehicle to the calibrated vehicle load limit; adjusting said assembly such that it is triggered; unloading the vehicle; and manually resetting the indicator.

17. A load indicator device for a suspended vehicle having a frame comprising:

a plunger assembly including a shaft having upper and lower ends and a pusher knob affixed to said upper end, said shaft slideably constrained relative to the vehicle frame and said lower end in contact with the suspension of the vehicle; and an indicator arm having a free end, said indicator arm rotatable relative to the vehicle frame;

in which when the vehicle is loaded less than a triggering load, said free end of said indicator arm is disposed above, and in sliding contact with, said pusher knob, and in response to loads on the vehicle frame, the vehicle suspension is compressed so as to push upwards on said lower end of said shaft, displacing said plunger assembly upward relative to the frame, pushing said free end of said indicator arm upwards, such that when the vehicle is loaded with a load equal to or greater than the triggering load, said plunger assembly moves upwards sufficiently to allow said free end of said indicator arm to rotate to a position below said pusher knob, in which position said indicator arm prevents said plunger assembly from moving downwards absent manual intervention.

18. A load indicator device for a suspended vehicle comprising:

a support plate having first and second adjustment slots in substantially parallel orientation to each other, said slots allowing said plate to be adjustably attached to the frame of a vehicle over a range of vertical positions;

a journal block affixed to said plate and having a vertical bore;

a plunger assembly including a shaft having upper and lower ends, a pusher knob affixed to said upper end, said shaft slideably received by said vertical bore and said lower end in contact with the suspension of the vehicle;

an indicator arm having a free end, said indicator arm rotatably attached to said support plate; and a biasing spring, positioned between said indicator arm and said support plate;

in which when the vehicle is loaded less than a triggering load, said free end of said indicator arm is disposed above, and in sliding contact with, said pusher knob, and in response to loads on the vehicle frame, the vehicle suspension is compressed and pushes upwards on said lower end of said shaft, displacing said plunger assembly upward relative to the frame, rotating said free end of said indicator arm upwards, such that when the vehicle is loaded with load equal to or greater than the triggering load, said plunger assembly moves upwards sufficiently to allow said free end of said indicator arm to rotate to a position below said pusher knob, in which position said indicator arm prevents said plunger assembly from moving downwards absent manual intervention.

19. A load indicator device for a suspended vehicle comprising:

a support plate having first and second adjustment slots in substantially parallel orientation to each other, said slots allowing the plate to be adjustably attached to the frame of a vehicle;

a journal block affixed to said support plate and having a vertical bore, said bore having upper and lower anti-friction devices disposed therein;

a plunger assembly including a shaft having upper and lower ends, a pusher knob affixed to said upper end and a rod end affixed to said lower end, said shaft slideably received by said vertical bore and said rod end in free contact with the axle housing of the vehicle; and an indicator arm having a free end, said indicator arm rotatably attached to said support plate; and a biasing spring, positioned between said indicator arm and said support plate;

in which when the vehicle is loaded less than a triggering load, said free end of said indicator arm is disposed above, and in sliding contact with, said pusher knob, and in response to loads on the vehicle frame, the vehicle suspension is compressed and pushes upwards on said lower end of said shaft, displacing said plunger assembly upward relative to the frame, rotating said free end of said indicator arm upwards, such that when the vehicle is loaded with a load equal to or greater than the triggering load, said plunger assembly moves upwards sufficiently to allow said free end of said indicator arm to rotate to a position below said pusher knob, in which position said indicator arm prevents said plunger assembly from moving downwards absent manual intervention.

20. A method for indicating load conditions for a suspended vehicle having a calibrated vehicle load limit, which comprises:

installing an indicator assembly comprising an indicator arm having a free end, said indicator arm rotatable relative to the vehicle frame and a plunger assembly having a pusher knob affixed to its upper end and its lower end in contact with any portion of the suspension, said free end of said indicator arm in sliding contact with said pusher knob, said free end of said indicator arm initially located above said pusher knob when the vehicle is loaded with less than a triggering load, and said plunger assembly moving upwards in response to increasing vehicle loads, such that when the triggering load is reached, said plunger assembly moves upwards sufficiently for said free end of said indicator arm to rotate to a position below said pusher knob;

loading the vehicle; and detecting the position of the indicator arm relative to said pusher knob.

* * * * *